Aug. 9, 1955 R. B. KENYON 2,714,745
APPARATUS FOR MANUFACTURING SHEETING
Filed Aug. 23, 1951 3 Sheets-Sheet 1

Roger B. Kenyon
INVENTOR.
BY Daniel I. Mayne
Donald H. Stewart
ATTORNEYS

Aug. 9, 1955 R. B. KENYON 2,714,745
APPARATUS FOR MANUFACTURING SHEETING
Filed Aug. 23, 1951 3 Sheets-Sheet 2

Roger B. Kenyon
INVENTOR.

BY
ATTORNEYS

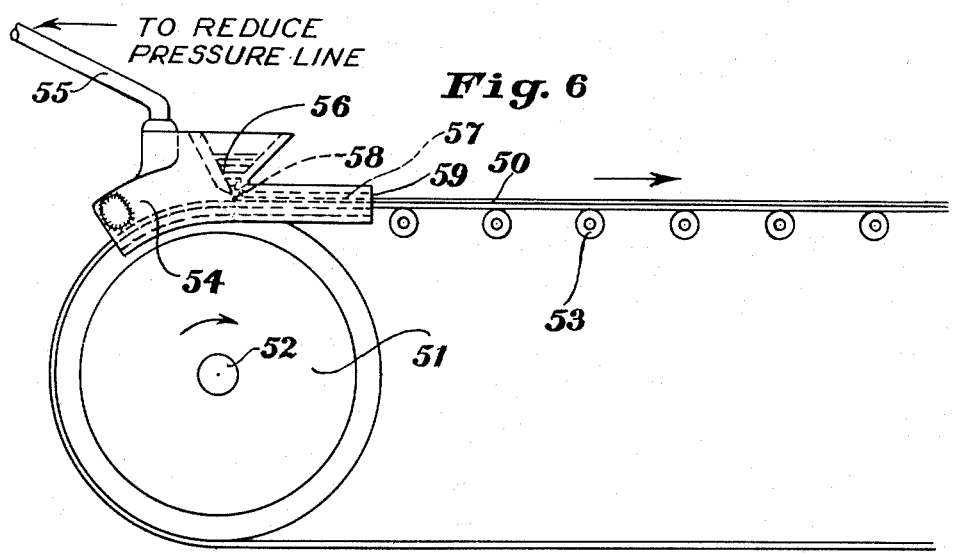
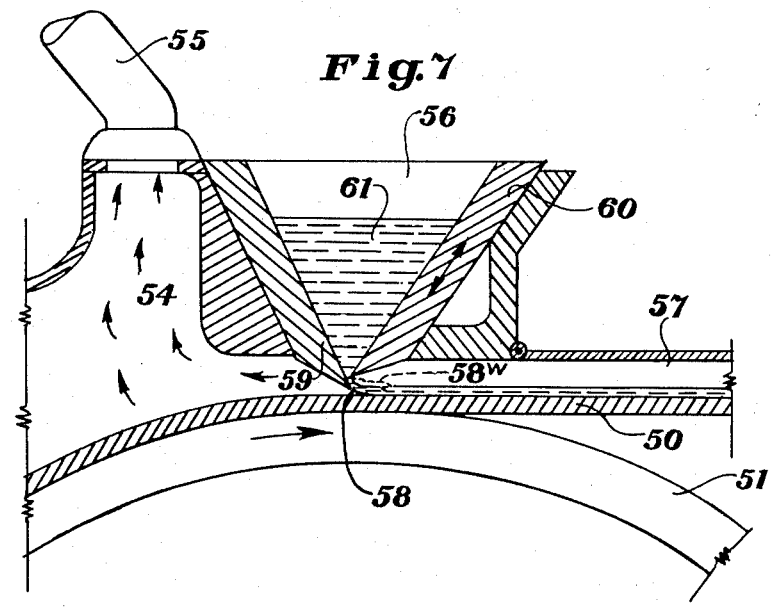

United States Patent Office 2,714,745
Patented Aug. 9, 1955

2,714,745

APPARATUS FOR MANUFACTURING SHEETING

Roger B. Kenyon, Rochester, N. Y., assignor to Eastman Kodak Company, Rochester, N. Y., a corporation of New Jersey Application August 23, 1951, Serial No. 243,214

8 Claims. (Cl. 18—15)

This invention relates to apparatus for manufacturing strip material, and particularly to an apparatus for manufacturing strip material from a cellulosic solution, such as cellulose acetate, cellulose triacetate, and the like.

It has been customary in the past to manufacture strip materials suitable for film base wrapping materials, coatings, and the like, by flowing a suitable cellulosic solution on a casting surface while moving past a coating station in a fixed path. During this movement, solvents may be removed and the sheeting may set and later be removed from the wheel in a known manner. The apparatus used for such sheeting has been quite satisfactory in that a good quality of sheeting could be produced but, unfortunately, most known types of machines for this purpose were very costly and could only cast the solution slowly so that it has been very desirable to produce apparatus which could cast at higher speeds. In the past, many attempts have been made to speed up apparatus used for making sheeting but it has been found that, with comparatively slight increases in speed, various difficulties occur which make such faster operation undesirable. "Cross-lines" or corrugations readily develop, particularly where the sheeting is thin, such as .001" to .003", for instance. Apparently vibrations of the stream of cellulosic material passing from the hopper to the casting surface may be the cause of such markings or lines. These can be avoided by slowing up the machine but, of course, this is undesirable.

In order to eliminate these and other difficulties, I have provided a machine for making sheeting with which the speed of the apparatus may be materially increased as, for instance, from 30 to 40%, and by which the cross-lines and corrugations may be either greatly reduced or entirely eliminated even at the increased speeds. I have accomplished this by providing a machine by which a thin narrow band or ribbon of cellulosic composition may be passed from a coating device to a casting surface, such as the surface of a large wheel, and I have provided this machine with a means for subjecting the stream or ribbon of cellulosic material to differential pressures. On the side of the ribbon from which the casting surface approaches the coating device, I have provided an enclosure with a means for partially exhausting the air from this enclosure. This reduced pressure is applied to one side of the ribbon only, and the opposite side of the ribbon is subjected to the pressure of the ambient atmosphere. The pressure differential need not be great, as from .7" to 2.00" of water vacuum is satisfactory for most coating compositions. More or less may be used if desired. In addition, I have provided a narrow, open-ended chamber designed to entrap a small quantity of solvents which are passed through the machine in such a way as to minimize or prevent the formation of solidified or partially jellied droplets of coating composition, particularly at the ends of the hopper blades.

My invention is, therefore, directed to an improved apparatus for making cellulosic sheeting on casting surfaces at considerably higher speeds than have heretofore been thought possible. A further object of my invention is to provide a machine which will eliminate "cross-lines" in sheeting, and particularly in thin sheeting. A still further object of my invention is to provide a machine for manufacturing sheeting at relatively high speeds in which the thickness of the sheeting can be accurately maintained. Other objects will appear from the following specification, the novel features being particularly pointed out in the claims at the end thereof.

In my copending application Serial No. 243,213, filed August 23, 1951, for Method of Manufacturing Sheeting Material, now abandoned, I have described a method which can be readily carried out by means of the apparatus which will be described in detail herein.

The objects of the invention are embodied in the machine schematically shown in the accompanying drawings in which like reference characters denote like parts throughout. It might be pointed out that these drawings show on an exaggerated scale only the more necessary portions of the machine, omitting many unnecessary parts to better illustrate the invention.

Fig. 6 is a fragmentary side elevation showing somewhat schematically a second embodiment of my invention; and Fig. 7 is an enlarged section through the hopper shown in Fig. 6, parts being omitted to better illustrate the invention.

Figure 1:
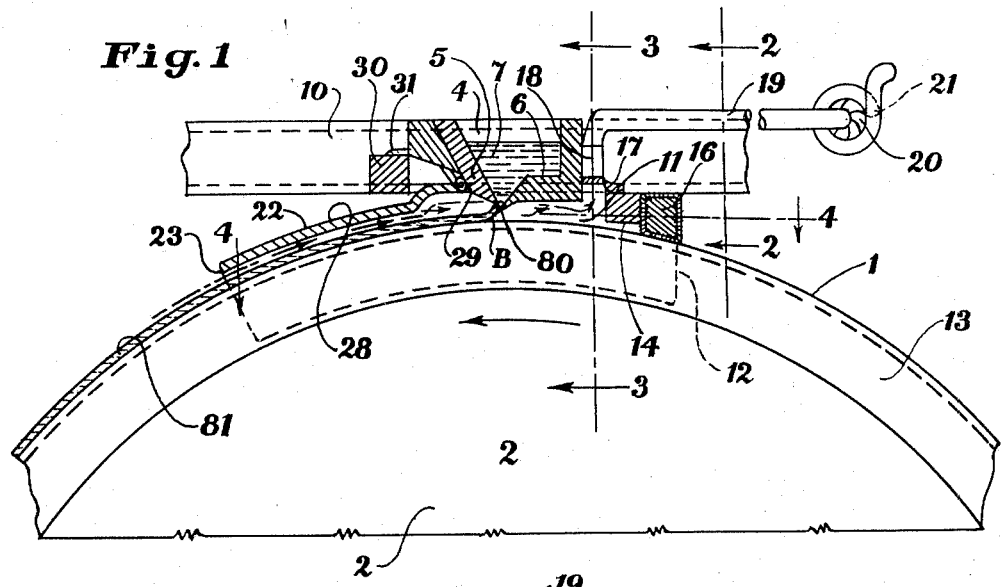
Fig. 1 is a schematic part-side elevation and part section through an improved apparatus for coating cellulose composition on a support and embodying a preferred form of my invention.
Figure 2:
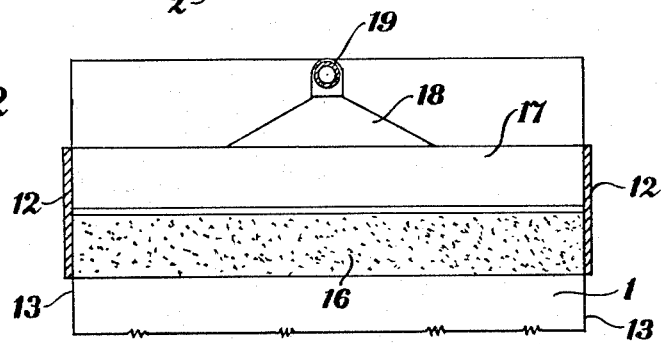
Fig. 2 is a section taken on line 2—2 of Fig. 1.
Figure 3:
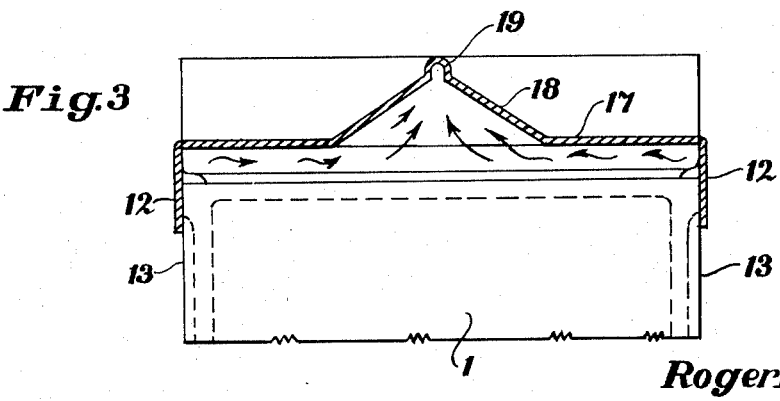
Fig. 3 is a section taken on line 3—3 of Fig. 1.

In the preferred embodiment of my invention, I have shown, in the first four figures, the coating apparatus may consist of a large wheel having a casting surface 1. This casting surface may have the finish required for the final sheeting and usually this surface is made as smooth as possible, being carefully ground and polished, and plated, often with a chromium plating as the outer layer preferably has a mirror-like polish. The wheel 2 may turn on suitable trunnions 3 and may be driven by power at the required speed in a known manner.

A hopper 4 may be mounted above the wheel, this hopper including blades 5 and 6 which are spaced close together along their lower edges to form a narrow opening through which coating solution 7 may pass from the coating device 4 to the casting surface 1 of the wheel 2. In making relatively thin sheeting, the spacing between the blades is quite slight as, for instance, .030", and the distance of the hopper blade 6 to the casting surface 1 may also be slight as, for instance, .06". These figures are purely by way of example and may be used when coating sheeting of from .001" to .003".

The hopper 4 may be supported by suitable frame members 10 on each side of the wheel and, in accordance with my invention, I provide a pair of side plates 12, closely fitting the smooth peripheries 13 of the wheel 2. This fit is such as to make a substantially air-tight fit. These side plates may be connected to a cross-bar 14, also supported by the frame members 10, and there is a second cross-bar 16 which is not attached to the frame members but which slides on the surface 1 of the wheel and is normally held up against the cross-bar 14 by the turning movement of the wheel. The bar 16 is completely covered by a layer of plush, or other soft material, so that it does not injure the surface 1 of the wheel and so that it makes a reasonably air-tight connection with the wheel and with the side plates.

Thus, the housing 11 has side walls, an end wall, and a top wall 17, which is tapered upwardly at 18 to a pipe 19, leading to the suction side 20 (in the present instance) of a fan 21. Such an apparatus will satisfactorily reduce the pressure in the chamber 11 to the required amount but, of course, if more or less pressure is required, it may be desirable to have the pipe 19 lead to some other source of reduced pressure lines, such as a vacuum line, to readily adjust the pressure.

With the housing made up of the walls described, it will be noted that the ribbon 80 of material flowing between the hopper blades 5 and 6 to the casting surface extends almost completely across the fourth side of the enclosure but does not quite do so. From Fig. 4, it will be noticed that the cellulosic material flows between the blades 5 and 6 and lies in a curved path as indicated at 25 on each outer edge thereof, after which the edges 26 become parallel as the sheeting reaches its full width and moves with the wheel as it turns. There is also a slight space 27 between the extreme edges of the cellulosic material and the side plates 12, this space in the present instance, for instance, being in neighborhood of .25" wide and perhaps .06" deep. These figures are given purely by way of example, since the scale of the drawing is purposely exaggerated to make this space look larger and to better illustrate the invention.

Figure 4:
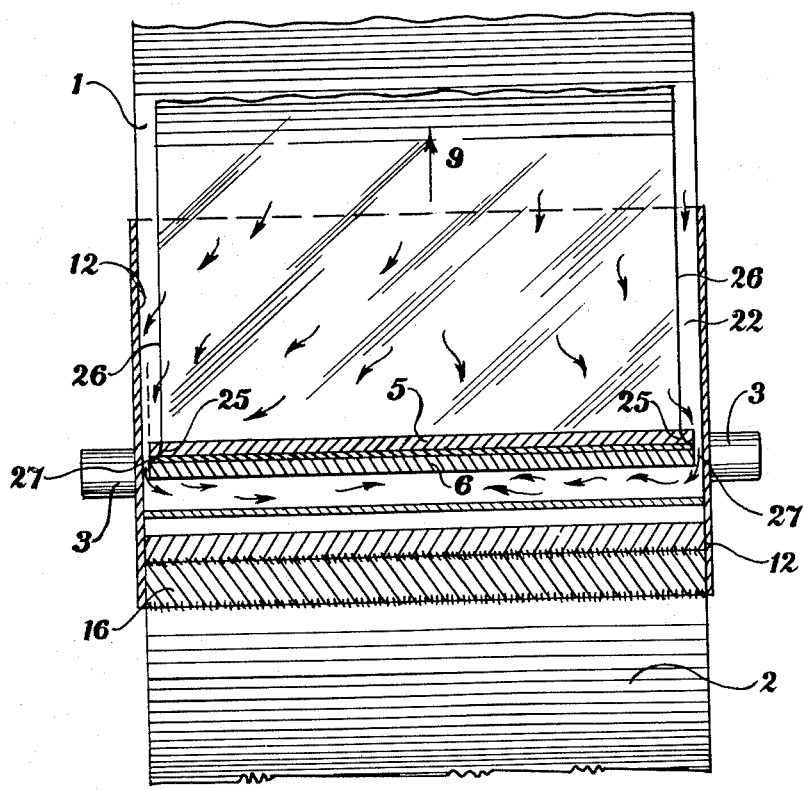
Fig. 4 is a section taken on line 4—4 of Fig. 1.

As the sheeting is cast, it sometimes happens that "slugging" occurs. This is the formation of small gelled beads or strings of coating solution, chiefly at the ends of the hopper blades 5 and 6. In order to prevent this slugging, I also provide a plenum chamber on the opposite side of the hopper. This is formed by the plate 22 which extends across between the two side plates 12. If desired, this plate may be hinged at 29 to the hopper or it merely may be connected to the side plates, leaving the end 23 open for the free entrance of air. It will be noticed that on that side of the hopper from which the casting surface moves after the sheeting has been deposited thereon is subjected to the ambient atmosphere. A small amount of air in the plenum chamber, however, which is solvent-laden, passes around through the openings 27 above described which are the narrow spaces between the extreme edges of the cellulosic material being cast and the side plates 12 as shown in Fig. 4. Even this relatively small amount of air flowing through these openings 27 because of the vacuum or reduced pressure in chamber 11 minimizes or prevents slugging at the ends of the hopper blades because they prevent the solution from setting until it reaches the casting surface 1.

Figure 5:
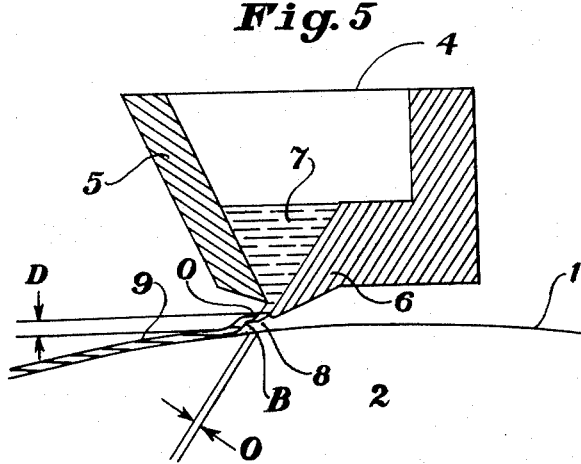
Fig. 5 is an enlarged fragmentary section through a typical hopper of the prior art showing also the relationship of the coating ribbon to the casting surface in the older types of coating apparatus.

In Fig. 5, it will be noticed that the bead 8 is pulled out into rather a long curve so that the layer 9, lying on the wheel 1, moves away from the hopper with the bead 8 sometimes fluttering or weaving because it is here shown as being unsupported on both sides by any pressure. However, when a partial vacuum is applied as, for instance, from .7" to 2.00" of water on the side 8 of the ribbon and atmospheric pressure is applied to the outgoing side O of the bead will tend to push the bead B backwardly so that, as shown in Fig. 1, the bead moves more nearly in a tangential direction to the casting surface than where this pressure does not apply, as in Fig. 5. In addition, the reduced pressure appears to hold the bead B relatively steady against fluttering and in a desirable coating position even though the machine may be operated at considerably greater speed as, for instance, from 30 to 40% greater through the use of this differential pressure equipment.

A second embodiment of my invention is schematically shown in Figs. 6 and 7. In this form, the casting surface 50 may be an endless belt passing around a pair of spaced rollers 51, only one of which is shown in the drawings. A series of idler rollers 53 help support the belt 50 in a plane. The coating device 54 is very like the one shown in Fig. 1 except that it is designed for a belt machine. There is a vacuum or reduced pressure chamber 54 in which pressure may be reduced to the desired amount, such as equal to from .7" to 2.00" of water vacuum. Coating material may be placed in a hopper 56 so as to flow a ribbon of coating composition upon the casting surface 50. The chamber 57 is open at the end 59 to room pressure. Here, again, the difference in pressure on the ribbon 58 is such as to hold the ribbon in a coating position and to prevent fluttering or weaving of the ribbon of coating composition, thereby spoiling the evenness of the coating. As in the first-described embodiment of my invention, reduced pressure is applied to the incoming side of the casting surface as it approaches the coating station so that this reduced pressure may act directly on the ribbon 58 while a small amount of the solvent vapors in chamber 57 will be drawn about the edges of the coating ribbon 58 and thereby prevent slugging.

While my apparatus is suitable for casting a large number of different types of cellulosic and other sheeting to a casting surface, as pointed out in my copending application above referred to, typical sheetings may comprise cellulose acetate dissolved in acetone, cellulose triacetate dissolved in 90% of methylene chloride, and 10% methyl alcohol. A solution of 4 to 5 parts of solvent mixture of 90% ethylene chloride and 10% methyl alcohol is used to dissolve as cellulose acetate propionate as disclosed in Patent No. 2,078,261. Fifteen parts by weight of triphenyl phosphate is added as a plasticizer. Casting temperatures may be 85° F. Viscosities may range from 9,000 to 42,000 cps. at 80° F. Casting temperatures for the solution of cellulose acetate may be 120° F. Casting temperatures for the cellulose triacetate may be 85° F. Casting speeds have been increased over known speeds of coating from 30 to 40% through the use of this differential pressure apparatus.

Obviously, the data given above is by way of example only and my apparatus is quite suitable for manufacturing sheeting with many different solutions other than the cellulose triacetate, cellulose acetate propionate, and the cellulose acetate given above, and the references given in my copending application.

From the specification, it will be seen that my improved apparatus for making sheeting accomplishes the several objects of my invention and is well adapted to meet the conditions of practical use.

As various changes may be made in my apparatus as set forth above, it is to be understood that all of the matter herein set forth and shown in the drawings is to be interpreted as illustrative only and not in a limiting sense.

Having thus described my invention, what I claim is new and desire to secure by Letters Patent of the United States is:

1. Apparatus for manufacturing sheeting comprising a wheel, a casting surface on the wheel, a hopper having blades close to but spaced from the casting surface, the casting surface moving past the hopper as the wheel turns to receive coating composition from the hopper, a housing extending to both sides of the hopper, the housing on one side comprising a top wall, side walls and an end wall forming with the casting surface a substantially airtight enclosure and the housing on the other side of the hopper comprising side walls, a top wall and forming with the casting surface a generally tubular extension open at one end, means for providing reduced pressure in the substantially air-tight housing section, said section lying on that side of the hopper toward which the casting surface approaches the hopper to receive coating composition, the side walls of the housing sections being continuous and lying close to the ends of the hopper blades and to the edges of the wheel, whereby the ends of a ribbon of coating composition flowing from the hopper blades to the casting surface may lie adjacent the side walls and whereby the means for providing a reduced pressure in the substantially air-tight housing may hold the ribbon of coating composition in a sheet depositing position.

2. Apparatus for manufacturing sheeting from sheet-forming compositions comprising a rotatable wheel having a casting surface thereon, a hopper adjacent to but spaced from the casting surface through which a ribbon of sheet-forming composition may flow from the hopper to the casting surface as the wheel turns thereby moving the casting surface past the hopper, a housing extending to both sides of the hopper, the extension on that side of the hopper towards which the casting surface approaches the hopper including a top wall, side walls, one end wall all forming with the casting surface a substantially air-tight housing section, means connected thereto for reducing the pressure therein below the ambient atmosphere, the housing extension on that side of the hopper from which the sheet-forming composition moves from the hopper including side walls, and a top wall, which, with the casting surface forms an elongated housing having an open end, whereby the ribbon of sheet-forming composition from the hopper to the casting surface, the ends of which are adjacent but out of contact with the side walls, may be held in a depositing position.

3. Apparatus for manufacturing sheeting from sheet-forming compositions comprising a rotatable wheel having a casting surface thereon, a hopper adjacent to but spaced from the casting surface through which a ribbon of sheet-forming composition may flow from the hopper to the casting surface as the wheel turns thereby moving the casting surface past the hopper, a housing extending to both sides of the hopper, the extension on that side of the hopper towards which the casting surface approaches the hopper including a top wall, side walls, one end wall all forming with the casting surface a substantially air-tight housing section, means connected thereto for reducing the pressure therein below the ambient atmosphere, the housing extension on that side of the hopper from which the sheet-forming composition moves from the hopper including side walls, and a top wall, which, with the casting surface forms an elongated housing having an open end, whereby the ribbon of sheet-forming composition from the hopper to the casting surface, the ends of which are adjacent but out of contact with the side walls, may be held in a depositing position, the housing side walls adjacent the hopper blades lying not more than .25" from the ribbon of sheet-forming composition flowing from the hopper blades to the casting surface.

4. Apparatus for manufacturing sheeting from cellulose materials dissolved in solvents and comprising a casting surface, a hopper adjacent to but spaced therefrom, blades forming part of the hopper for delivering a narrow flowing ribbon of sheet-forming composition from the hopper blades to the casting surface spaced therefrom, a housing extending to both sides of the hopper, that section of the housing through which the film-forming composition moves from the hopper including a top wall and side walls, which, with the casting surface form an elongated open-ended housing section, the other housing section lying on the opposite side of the hopper and being formed of a top wall, side walls and an end wall forming with the casting surface a substantially air-tight housing section, means for reducing pressure in said last named housing section, thereby subjecting one side of the ribbon only to a reduced pressure, and means for entrapping solvents from the first mentioned housing section.

5. Apparatus for manufacturing sheeting from cellulose materials dissolved in solvents and comprising a casting surface, a hopper adjacent to but spaced therefrom, blades forming part of the hopper for delivering a narrow flowing ribbon of sheet-forming composition from the hopper blades to the casting surface spaced therefrom, a housing extending to both sides of the hopper, that section of the housing through which the film-forming composition moves from the hopper including a top wall and side walls, which, with the casting surface form an elongated open-ended housing section, the other housing section lying on the opposite side of the hopper and being formed of a top wall, side walls and an end wall forming with the casting surface a substantially air-tight housing section, means for reducing pressure in said last named housing section, thereby subjecting one side of the ribbon only to a reduced pressure while the other side of the ribbon of coating composition is subjected to the ambient atmosphere through the elongated open-ended housing section.

6. Apparatus for manufacturing sheeting from cellulose materials dissolved in solvents and comprising a casting surface, a hopper adjacent to but spaced therefrom, blades forming part of the hopper for delivering a narrow flowing ribbon of sheet-forming composition from the hopper blades to the casting surface spaced therefrom, a housing extending to both sides of the hopper, that section of the housing through which the film-forming composition moves from the hopper including a top wall and side walls, which, with the casting surface form an elongated open-ended housing section, the other housing section lying on the opposite side of the hopper and being formed of a top wall, side walls and an end wall forming with the casting surface a substantially airtight housing section, means for reducing pressure in said last named housing section, thereby subjecting one side of the ribbon only to a reduced pressure, and means for entrapping solvents from the first mentioned housing section, the lateral edges of the ribbon of coating composition being inside the side walls of the housing and being spaced therefrom a distance sufficient for solvent vapors to be drawn from the elongated open-ended housing section through which the sheet-forming composition passes to the substantially air-tight housing section by the reduced pressure therein.

7. Apparatus for forming sheeting from cellulose compositions dissolved in suitable solvents, comprising a wheel including a casting surface movable on fixed trunnions to move the casting surface past a hopper spaced therefrom, said hopper comprising means for delivering a ribbon of cellulosic composition from the hopper to the casting surface, which ribbon is unsupported by apparatus between the hopper and the casting surface, a housing extending to each side of the hopper about a portion of the casting surface, the hopper housing on that side of the hopper from which the cellulosic composition leaves the hopper including a top wall and side walls which, with a part of the casting surface forms an elongated housing section open at one end, the other housing section comprising a top wall, side walls, and an end wall which, with a portion of the casting surface forms a substantially airtight housing section, the ribbon of cellulosic composition being between the two housing sections, and a pressure reducing device connected with the substantially air-tight section to cause a reduced pressure to act on that side of the flowing ribbon of cellulosic composition which may contact the casting surface while the opposite side of the ribbon is exposed to the ambient atmosphere.

8. Apparatus for forming sheeting from cellulose compositions dissolved in suitable solvents, comprising a wheel including a casting surface movable on fixed trunnions to move the casting surface past a hopper spaced therefrom, said hopper comprising means for delivering a ribbon of cellulosic composition from the hopper to the casting surface, which ribbon is unsupported by apparatus between the hopper and the casting surface, a housing extending to each side of the hopper about a portion of the casting surface, the hopper housing on that side of the hopper from which the cellulosic composition leaves the hopper including a top wall and side walls which, with a part of the casting surface forms an elongated housing section open at one end, the top and side walls generally conforming to the shape of the casting surface wheel to form a passageway for solvent vapors, the other housing section comprising a top wall, side walls and an end wall which, with a portion of the casting surface forms a substantially air-tight housing section, the ribbon of cellulosic composition being between the two housing sections and terminating adjacent the side wall of the housing leaving narrow passageways about the ends of the ribbon of cellulosic composition between the first and second mentioned housings for solvent vapors, and a pressure reducing device connected with the substantially air-tight section to cause a reduced pressure to act on that side of the flowing ribbon of cellulosic composition which may contact the casting surface while the opposite side of the ribbon is exposed to the ambient atmosphere whereby the solvent vapors may be drawn from the first mentioned housing section into the second mentioned housing section to prevent particles of cellulosic composition from becoming prematurely gelled and the ribbon of cellulosic composition may be held in a sheet depositing position.

References Cited in the file of this patent

UNITED STATES PATENTS

| | | |
|---|---|---|
| 2,036,377 | Wells | Apr. 7, 1936 |
| 2,369,484 | Nadeau | Feb. 13, 1945 |